United States Patent
Senn et al.

(10) Patent No.: US 7,486,945 B2
(45) Date of Patent: *Feb. 3, 2009

(54) SYSTEMS AND METHODS FOR PRERATING COSTS FOR A COMMUNICATION EVENT

(75) Inventors: Paul Senn, Swampscott, MA (US); Thomas Erskine, Marblehead, MA (US); John Cooper, Tewksbury, MA (US); Kenneth W. Sonberg, Andover, MA (US)

(73) Assignee: Boston Communications Group, Inc., Bedford, MA (US)

( * ) Notice: Subject to any disclaimer, the term of this patent is extended or adjusted under 35 U.S.C. 154(b) by 397 days.

This patent is subject to a terminal disclaimer.

(21) Appl. No.: 10/795,901

(22) Filed: Mar. 8, 2004

(65) Prior Publication Data

US 2004/0171368 A1    Sep. 2, 2004

Related U.S. Application Data

(63) Continuation of application No. 09/371,176, filed on Aug. 11, 1999, now Pat. No. 6,704,563.

(60) Provisional application No. 60/096,065, filed on Aug. 11, 1998.

(51) Int. Cl.
*H04M 11/00*    (2006.01)

(52) U.S. Cl. .................. 455/406; 455/405; 455/407; 455/408; 455/421; 379/114.01; 379/114.16; 705/52

(58) Field of Classification Search ......... 455/405–409, 455/421, 453; 379/114.1–114.05, 144.01, 379/111, 114.16; 705/52
See application file for complete search history.

(56) References Cited

U.S. PATENT DOCUMENTS

| | | | |
|---|---|---|---|
| 3,453,389 A | 7/1969 | Shaer | 179/7.1 |
| 3,652,795 A | 3/1972 | Wolf et al. | 179/2 |
| 3,654,396 A | 4/1972 | Biezeveld | 179/18 |
| 3,676,597 A | 7/1972 | Peterson | 179/6.3 |
| 3,692,946 A | 9/1972 | Budrys et al. | 179/18 |
| 3,693,156 A | 9/1972 | DiLello | 340/149 |
| 3,697,693 A | 10/1972 | Deschenes et al. | 179/2 |
| 3,718,764 A | 2/1973 | Deschenes et al. | 179/2 |
| 3,731,000 A | 5/1973 | Joel, Jr. | 179/8 |

(Continued)

FOREIGN PATENT DOCUMENTS

CA    2213037    2/1998

(Continued)

OTHER PUBLICATIONS

International Search Report.

(Continued)

*Primary Examiner*—Sharad Rampuria
(74) *Attorney, Agent, or Firm*—Weingarten, Schurgin, Gagnebin & Lebovici LLP

(57) ABSTRACT

Systems and methods for preparing communication events, such as telephone calls, for prepaying customers are described. The systems and methods permit, at the beginning of a communication event, the determination of a time limit for the event based on the available balance in a prepayment account associated with the event.

45 Claims, 4 Drawing Sheets

U.S. PATENT DOCUMENTS

| | | | |
|---|---|---|---|
| 3,818,455 A | 6/1974 | Brenski et al. | 340/172.5 |
| 3,838,225 A | 9/1974 | Limberg et al. | 179/27 |
| 3,852,571 A | 12/1974 | Hall et al. | 235/61.7 |
| 3,870,866 A | 3/1975 | Halpern | 235/61.7 |
| 3,892,948 A | 7/1975 | Constable | 340/149 |
| 3,920,908 A | 11/1975 | Kraus | 179/2 |
| 3,938,091 A | 2/1976 | Atalla et al. | 340/149 |
| 4,007,339 A | 2/1977 | Joel, Jr. | 179/27 |
| 4,086,439 A | 4/1978 | Vowles et al. | 179/27 |
| 4,122,308 A | 10/1978 | Weinberger et al. | 179/7.1 |
| 4,162,377 A | 7/1979 | Mearns | 179/18 |
| 4,191,860 A | 3/1980 | Weber | 179/18 |
| 4,192,972 A | 3/1980 | Bertoglio et al. | 179/6.3 |
| 4,224,472 A | 9/1980 | Zarount | 179/27.1 |
| 4,243,841 A | 1/1981 | Young | 179/6.3 |
| 4,264,956 A | 4/1981 | Delaney | 364/467 |
| 4,277,649 A | 7/1981 | Sheinbein | 179/18 |
| 4,300,041 A | 11/1981 | Nama | 235/449 |
| 4,310,726 A | 1/1982 | Asmuth | 179/18 |
| 4,332,985 A | 6/1982 | Samuel | 179/90 |
| 4,351,028 A | 9/1982 | Peddie et al. | 364/483 |
| 4,399,330 A | 8/1983 | Kuenzel | 179/2 |
| 4,400,587 A | 8/1983 | Taylor et al. | 179/27 |
| 4,410,765 A | 10/1983 | Hestad et al. | 179/7.1 |
| 4,439,636 A | 3/1984 | Newkirk et al. | 179/7.1 |
| 4,506,116 A | 3/1985 | Genest | 179/90 |
| 4,517,412 A | 5/1985 | Newkirk et al. | 179/7.1 |
| 4,518,824 A | 5/1985 | Mondardini | 179/6.3 |
| 4,585,904 A | 4/1986 | Mincone et al. | 179/7.1 |
| 4,587,379 A | 5/1986 | Masuda | 179/7.1 |
| 4,594,663 A | 6/1986 | Nagata et al. | 364/401 |
| 4,595,983 A | 6/1986 | Gehalo et al. | 364/401 |
| 4,611,096 A | 9/1986 | Asmuth et al. | 179/18 |
| 4,640,986 A | 2/1987 | Yotsutani et al. | 379/60 |
| 4,680,785 A | 7/1987 | Akiyama et al. | 379/57 |
| 4,698,752 A | 10/1987 | Goldstein et al. | 364/200 |
| 4,706,275 A | 11/1987 | Kamil | 379/144 |
| 4,726,056 A * | 2/1988 | An et al. | 379/114.01 |
| 4,755,872 A | 7/1988 | Bestler et al. | 358/86 |
| 4,756,020 A | 7/1988 | Fodale | 379/112 |
| 4,776,000 A | 10/1988 | Parienti | 379/42 |
| 4,776,003 A | 10/1988 | Harris | 379/91 |
| 4,776,033 A | 10/1988 | Scheinert | 455/31 |
| 4,777,646 A | 10/1988 | Harris | 379/91 |
| 4,777,647 A | 10/1988 | Smith et al. | 379/151 |
| 4,791,640 A | 12/1988 | Sand | 370/58 |
| 4,813,065 A | 3/1989 | Segala | 379/112 |
| 4,831,647 A | 5/1989 | D'Avello et al. | 379/58 |
| 4,845,740 A | 7/1989 | Tokuyama et al. | 379/91 |
| 4,852,149 A | 7/1989 | Zwick et al. | 379/67 |
| 4,852,155 A | 7/1989 | Barraud | 379/145 |
| 4,860,336 A | 8/1989 | D'Avello et al. | 376/63 |
| 4,860,341 A | 8/1989 | D'Avello et al. | 379/91 |
| 4,879,744 A | 11/1989 | Tasaki et al. | 379/144 |
| 4,893,330 A | 1/1990 | Franco | 379/91 |
| 4,897,870 A | 1/1990 | Golden | 379/144 |
| 4,899,373 A | 2/1990 | Lee et al. | 379/207 |
| 4,901,340 A | 2/1990 | Parker et al. | 379/60 |
| 4,930,150 A | 5/1990 | Katz | 379/93 |
| 4,930,154 A | 5/1990 | Bauer et al. | 379/246 |
| 4,935,956 A | 6/1990 | Hellwarth et al. | 379/112 |
| 4,942,598 A | 7/1990 | Davis | 379/57 |
| 4,951,308 A | 8/1990 | Bishop et al. | 379/91 |
| 4,955,049 A | 9/1990 | Ghisler | 379/58 |
| 4,958,368 A | 9/1990 | Parker | 379/91 |
| 4,965,821 A | 10/1990 | Bishop et al. | 379/91 |
| 4,979,207 A | 12/1990 | Baum et al. | 379/112 |
| 4,984,290 A | 1/1991 | Levine et al. | 455/33 |
| 4,996,705 A | 2/1991 | Entenmann et al. | 379/91 |
| 5,003,585 A | 3/1991 | Richer | 379/144 |
| 5,003,595 A | 3/1991 | Collins et al. | 380/25 |
| 5,007,077 A | 4/1991 | Fields et al. | 379/67 |
| 5,008,929 A | 4/1991 | Olsen et al. | 379/112 |
| 5,014,301 A | 5/1991 | Maltezos | 379/155 |
| 5,027,388 A * | 6/1991 | Bradshaw et al. | 379/114.1 |
| 5,040,177 A | 8/1991 | Martin et al. | 370/110.1 |
| 5,046,088 A | 9/1991 | Margulies | 379/211 |
| 5,063,588 A | 11/1991 | Patsiokas et al. | 340/57 |
| 5,068,891 A | 11/1991 | Marshall | 379/91 |
| 5,103,449 A | 4/1992 | Jolissaint | 370/110.1 |
| 5,109,401 A | 4/1992 | Hattori et al. | 379/58 |
| 5,127,040 A | 6/1992 | D'Avello et al. | 379/58 |
| 5,128,938 A | 7/1992 | Borras | 370/95.1 |
| 5,134,646 A | 7/1992 | Carlson | 379/67 |
| 5,138,648 A | 8/1992 | Palomeque et al. | 379/22 |
| 5,138,650 A | 8/1992 | Stahl et al. | 379/61 |
| 5,144,649 A | 9/1992 | Zicker et al. | 379/59 |
| 5,148,472 A * | 9/1992 | Freese et al. | 455/408 |
| 5,148,474 A | 9/1992 | Haralambopoulos et al. | 379/111 |
| 5,159,625 A | 10/1992 | Zicker | 379/59 |
| 5,161,181 A | 11/1992 | Zwick | 379/67 |
| 5,164,923 A | 11/1992 | Avis | 368/4 |
| 5,185,781 A | 2/1993 | Dowden et al. | 379/67 |
| 5,185,782 A | 2/1993 | Srinivasan | 379/67 |
| 5,187,710 A | 2/1993 | Chau et al. | 370/110.1 |
| 5,192,947 A | 3/1993 | Neustein | 340/825.44 |
| 5,206,899 A | 4/1993 | Gupta et al. | 379/120 |
| 5,216,703 A | 6/1993 | Roy | 379/59 |
| 5,220,593 A | 6/1993 | Zicker et al. | 379/59 |
| 5,222,120 A | 6/1993 | McLeod et al. | 379/88 |
| 5,222,125 A | 6/1993 | Creswell et al. | 379/67 |
| 5,233,642 A | 8/1993 | Renton | 379/59 |
| 5,243,643 A | 9/1993 | Sattar et al. | 379/88 |
| 5,265,155 A | 11/1993 | Castro | 379/112 |
| 5,268,958 A | 12/1993 | Nakano | 379/211 |
| 5,272,747 A | 12/1993 | Meads | 379/59 |
| 5,274,802 A | 12/1993 | Altine | 395/600 |
| 5,276,444 A | 1/1994 | McNair | 340/925.33 |
| 5,276,731 A | 1/1994 | Arbel et al. | 379/88 |
| 5,282,243 A | 1/1994 | Dabbaghi et al. | 379/201 |
| 5,289,528 A | 2/1994 | Ueno et al. | 379/67.1 |
| 5,291,543 A | 3/1994 | Freese et al. | 379/59 |
| 5,297,189 A | 3/1994 | Chabernaud | 379/58 |
| 5,301,223 A | 4/1994 | Amadon et al. | 379/88 |
| 5,301,234 A | 4/1994 | Mazziotto et al. | 380/23 |
| 5,301,246 A | 4/1994 | Archibald et al. | 380/23 |
| 5,303,285 A | 4/1994 | Kerihuel et al. | 379/58 |
| 5,303,297 A * | 4/1994 | Hillis | 455/406 |
| 5,309,501 A | 5/1994 | Kozik et al. | 379/58 |
| 5,311,569 A | 5/1994 | Brozovich et al. | 379/45 |
| 5,311,572 A | 5/1994 | Friedes et al. | 379/67 |
| 5,319,699 A | 6/1994 | Kerihuel et al. | 379/58 |
| 5,321,735 A | 6/1994 | Breeden et al. | 379/58 |
| 5,325,418 A | 6/1994 | McGregor et al. | 379/59 |
| 5,327,144 A | 7/1994 | Stilp et al. | 342/387 |
| 5,327,482 A | 7/1994 | Yamamoto | 379/61 |
| 5,327,485 A | 7/1994 | Leaden | 379/95 |
| 5,329,578 A | 7/1994 | Brennan et al. | 379/67 |
| 5,339,352 A | 8/1994 | Armstrong et al. | 379/58 |
| 5,341,414 A | 8/1994 | Popke | 379/142 |
| 5,345,498 A | 9/1994 | Mauger | 379/58 |
| 5,345,595 A | 9/1994 | Johnson et al. | 455/33.1 |
| 5,352,876 A | 10/1994 | Watanabe et al. | 235/381 |
| 5,353,335 A * | 10/1994 | D'Urso et al. | 379/114.2 |
| 5,359,182 A | 10/1994 | Schilling | 235/380 |
| 5,359,642 A | 10/1994 | Castro | 379/121 |
| 5,359,643 A | 10/1994 | Gammino | 379/143 |
| 5,365,575 A | 11/1994 | Katz | 379/92 |
| 5,369,699 A | 11/1994 | Page et al. | 379/38 |
| 5,371,493 A | 12/1994 | Sharpe et al. | 340/825.34 |
| 5,377,267 A | 12/1994 | Suzuki et al. | 380/23 |
| 5,381,467 A | 1/1995 | Rosinski et al. | 379/121 |
| 5,384,825 A | 1/1995 | Dillard et al. | 379/59 |

| Patent | Kind | Date | Inventor | Class |
|---|---|---|---|---|
| 5,384,831 | A | 1/1995 | Creswell et al. | 379/67 |
| 5,396,545 | A | 3/1995 | Nair et al. | 379/91 |
| 5,396,558 | A | 3/1995 | Ishiguro et al. | 380/25 |
| 5,404,580 | A | 4/1995 | Simpson et al. | 455/89 |
| 5,408,513 | A | 4/1995 | Busch, Jr. et al. | 379/59 |
| 5,408,519 | A | 4/1995 | Pierce et al. | 379/67 |
| 5,409,092 | A | 4/1995 | Itako et al. | 194/210 |
| 5,412,726 | A | 5/1995 | Nevoux et al. | 380/24 |
| 5,418,844 | A | 5/1995 | Morrisey et al. | 379/207 |
| 5,423,068 | A | 6/1995 | Hecker | 455/56.1 |
| 5,426,634 | A | 6/1995 | Cote et al. | 370/58.2 |
| 5,428,677 | A | 6/1995 | Hakamada | 379/144 |
| 5,438,615 | A | 8/1995 | Moen | 379/144 |
| 5,440,621 | A * | 8/1995 | Castro | 379/114.2 |
| 5,448,627 | A | 9/1995 | Ueno et al. | 379/67 |
| 5,448,633 | A | 9/1995 | Jamaleddin et al. | 379/201 |
| 5,450,477 | A | 9/1995 | Amarant et al. | 379/93 |
| 5,450,479 | A | 9/1995 | Alesio et al. | 379/144 |
| 5,465,289 | A | 11/1995 | Kennedy, Jr. | 379/59 |
| 5,465,293 | A | 11/1995 | Chiller et al. | 379/89 |
| 5,467,388 | A | 11/1995 | Redd, Jr. et al. | 379/189 |
| 5,469,496 | A | 11/1995 | Emery et al. | 379/58 |
| 5,469,497 | A | 11/1995 | Pierce et al. | 379/67 |
| 5,473,681 | A | 12/1995 | Partridge, III | 379/229 |
| 5,477,038 | A | 12/1995 | Levine et al. | 235/380 |
| 5,485,505 | A | 1/1996 | Norman et al. | 379/58 |
| 5,495,521 | A | 2/1996 | Rangachar | 379/95 |
| 5,502,761 | A | 3/1996 | Duncan et al. | 379/142 |
| 5,504,808 | A | 4/1996 | Hamrick, Jr. | 379/144 |
| 5,509,056 | A | 4/1996 | Ericsson et al. | 379/144 |
| 5,511,114 | A | 4/1996 | Stimson et al. | 379/114 |
| 5,517,549 | A | 5/1996 | Lee | 379/58 |
| 5,517,555 | A | 5/1996 | Amadon et al. | 379/59 |
| 5,517,559 | A | 5/1996 | Hayashi et al. | 379/112 |
| 5,519,769 | A * | 5/1996 | Weinberger et al. | 379/114.02 |
| 5,524,142 | A | 6/1996 | Lewis et al. | 379/112 |
| 5,524,146 | A | 6/1996 | Morrisey et al. | 379/201 |
| 5,526,401 | A | 6/1996 | Roach, Jr. et al. | 379/59 |
| 5,526,413 | A | 6/1996 | Cheston, III et al. | 379/201 |
| 5,544,227 | A | 8/1996 | Blust et al. | 379/63 |
| 5,544,229 | A | 8/1996 | Creswell et al. | 379/67 |
| 5,546,444 | A | 8/1996 | Roach, Jr. et al. | 379/59 |
| 5,546,446 | A | 8/1996 | Tsunokawa et al. | 379/114 |
| 5,550,897 | A | 8/1996 | Seiderman | 379/59 |
| 5,550,899 | A | 8/1996 | McLeod et al. | 379/67 |
| 5,553,120 | A | 9/1996 | Katz | 379/88 |
| 5,555,290 | A | 9/1996 | McLeod et al. | 379/67 |
| 5,559,871 | A | 9/1996 | Smith | 379/115 |
| 5,561,706 | A | 10/1996 | Fenner | 379/60 |
| 5,561,707 | A | 10/1996 | Katz | 379/88 |
| 5,561,854 | A | 10/1996 | Antic et al. | 455/56.1 |
| 5,563,934 | A | 10/1996 | Eda | 379/144 |
| 5,570,416 | A | 10/1996 | Kroll | 379/114 |
| 5,572,583 | A | 11/1996 | Wheeler, Jr. et al. | 379/207 |
| 5,577,100 | A | 11/1996 | McGregor et al. | 379/58 |
| 5,577,101 | A | 11/1996 | Böhm | 379/58 |
| 5,577,109 | A | 11/1996 | Stimson et al. | 379/112 |
| 5,577,110 | A | 11/1996 | Aquino | 379/201 |
| 5,579,375 | A | 11/1996 | Ginter | 379/59 |
| 5,579,376 | A | 11/1996 | Kennedy, III et al. | 379/60 |
| 5,579,379 | A | 11/1996 | D'Amico et al. | 379/112 |
| 5,583,918 | A | 12/1996 | Nakagawa | 379/61 |
| 5,583,920 | A | 12/1996 | Wheeler, Jr. | 379/88 |
| 5,586,175 | A | 12/1996 | Hogan et al. | 379/112 |
| 5,590,181 | A | 12/1996 | Hogan et al. | 379/144 |
| 5,592,535 | A | 1/1997 | Klotz | 379/58 |
| 5,592,537 | A | 1/1997 | Moen | 379/67 |
| 5,600,706 | A * | 2/1997 | Dunn et al. | 455/456.2 |
| 5,602,906 | A | 2/1997 | Phelps | 379/114 |
| 5,606,602 | A | 2/1997 | Johnson et al. | 379/115 |
| 5,608,778 | A | 3/1997 | Partridge, III | 379/58 |
| 5,610,972 | A * | 3/1997 | Emery et al. | 455/445 |
| 5,610,973 | A | 3/1997 | Comer | 379/59 |
| 5,615,251 | A | 3/1997 | Hogan et al. | 379/112 |
| 5,615,408 | A | 3/1997 | Johnson et al. | 455/33.1 |
| 5,625,669 | A | 4/1997 | McGregor et al. | 379/58 |
| 5,627,887 | A | 5/1997 | Freedman | 379/144 |
| 5,631,947 | A | 5/1997 | Wittstein et al. | 379/59 |
| 5,633,919 | A | 5/1997 | Hogan et al. | 379/115 |
| 5,638,430 | A | 6/1997 | Hogan et al. | 379/112 |
| 5,646,839 | A | 7/1997 | Katz | 379/93.01 |
| 5,657,377 | A | 8/1997 | Pinard et al. | 379/93.02 |
| 5,659,601 | A * | 8/1997 | Cheslog | 379/121.02 |
| 5,673,299 | A | 9/1997 | Fuller et al. | 379/57 |
| 5,673,306 | A | 9/1997 | Amadon et al. | 379/59 |
| 5,675,607 | A | 10/1997 | Alesio et al. | 379/114 |
| 5,677,945 | A | 10/1997 | Mullins et al. | 379/91 |
| 5,684,863 | A | 11/1997 | Katz | 379/88 |
| 5,689,552 | A | 11/1997 | Gibilisco | 379/145 |
| 5,692,037 | A | 11/1997 | Friend | 379/114 |
| 5,694,455 | A | 12/1997 | Goodman | 379/59 |
| 5,708,702 | A | 1/1998 | DePaul et al. | 379/230 |
| 5,719,926 | A | 2/1998 | Hill | 379/113 |
| 5,721,768 | A | 2/1998 | Stimson et al. | 379/114 |
| 5,722,067 | A | 2/1998 | Fougnies et al. | 455/406 |
| 5,727,057 | A | 3/1998 | Emery et al. | 379/211 |
| 5,732,131 | A | 3/1998 | Nimmagadda et al. | 379/211 |
| 5,732,346 | A | 3/1998 | Lazaridis et al. | 455/406 |
| 5,737,701 | A | 4/1998 | Rosenthal et al. | 455/411 |
| 5,748,720 | A | 5/1998 | Loder | 379/144 |
| 5,752,186 | A | 5/1998 | Malackowski et al. | 455/414 |
| 5,758,281 | A | 5/1998 | Emery et al. | 455/428 |
| 5,765,108 | A | 6/1998 | Martin et al. | 379/58 |
| 5,774,535 | A | 6/1998 | Castro | 379/144 |
| 5,774,802 | A * | 6/1998 | Tell et al. | 455/408 |
| 5,778,313 | A | 7/1998 | Fougnies | 455/406 |
| 5,781,855 | A | 7/1998 | Reuhkala et al. | 455/403 |
| 5,787,156 | A | 7/1998 | Katz | 379/93.13 |
| 5,790,636 | A | 8/1998 | Marshall | 379/67 |
| 5,793,846 | A | 8/1998 | Katz | 379/88 |
| 5,794,140 | A * | 8/1998 | Sawyer | 455/408 |
| 5,794,144 | A | 8/1998 | Comer et al. | 455/426 |
| 5,797,097 | A | 8/1998 | Roach, Jr. et al. | 455/456 |
| 5,799,156 | A | 8/1998 | Hogan et al. | 395/200.67 |
| 5,812,945 | A | 9/1998 | Hansen et al. | 455/403 |
| 5,814,798 | A | 9/1998 | Zancho | 235/380 |
| 5,815,551 | A | 9/1998 | Katz | 379/88 |
| 5,815,561 | A | 9/1998 | Nguyen et al. | 379/115 |
| 5,819,176 | A | 10/1998 | Rast | 455/422 |
| 5,826,185 | A | 10/1998 | Wise et al. | 455/405 |
| 5,828,734 | A | 10/1998 | Katz | 379/93.13 |
| 5,845,211 | A | 12/1998 | Roach, Jr. | 455/436 |
| 5,850,518 | A | 12/1998 | Northrup | 399/200.33 |
| 5,850,599 | A | 12/1998 | Seiderman | 455/406 |
| 5,854,833 | A | 12/1998 | Hogan et al. | 378/112 |
| 5,854,975 | A | 12/1998 | Fougnies et al. | |
| 5,864,604 | A | 1/1999 | Moen et al. | 379/88 |
| 5,873,043 | A | 2/1999 | Comer | 455/458 |
| 5,873,099 | A | 2/1999 | Hogan et al. | 707/204 |
| 5,898,762 | A | 4/1999 | Katz | 379/93.12 |
| 5,909,485 | A | 6/1999 | Martin et al. | 379/144 |
| 5,917,893 | A | 6/1999 | Katz | 379/93.02 |
| 5,940,755 | A | 8/1999 | Scott | 455/426 |
| 5,946,380 | A | 8/1999 | Cohen et al. | 379/127 |
| 5,953,398 | A | 9/1999 | Hill | 379/112 |
| 5,960,416 | A | 9/1999 | Block | 705/34 |
| 5,987,118 | A | 11/1999 | Dickerman et al. | 379/265 |
| 5,991,413 | A | 11/1999 | Arditti et al. | 380/25 |
| 5,991,615 | A | 11/1999 | Coppinger et al. | |
| 5,995,822 | A * | 11/1999 | Smith et al. | 455/406 |
| 6,003,770 | A | 12/1999 | Schilling | 235/382.5 |
| 6,016,343 | A | 1/2000 | Hogan et al. | 379/242 |
| 6,016,344 | A | 1/2000 | Katz | 379/260 |
| 6,029,062 | A | 2/2000 | Hanson | 455/408 |
| 6,035,021 | A | 3/2000 | Katz | 379/93.12 |
| 6,035,025 | A | 3/2000 | Hanson | 379/144 |

| | | | |
|---|---|---|---|
| 6,044,135 A | 3/2000 | Katz | 379/93.13 |
| 6,044,265 A | 3/2000 | Roach, Jr. | 455/419 |
| 6,058,173 A | 5/2000 | Penfield et al. | 379/144 |
| 6,058,300 A | 5/2000 | Hanson | 455/406 |
| 6,070,066 A | 5/2000 | Lundborg et al. | |
| 6,075,982 A * | 6/2000 | Donovan et al. | 455/406 |
| 6,101,378 A | 8/2000 | Barabash et al. | 455/406 |
| 6,108,537 A | 8/2000 | Comer et al. | 455/426 |
| 6,122,354 A * | 9/2000 | Dowens | 379/114.2 |
| 6,125,275 A | 9/2000 | Comer et al. | 455/426 |
| 6,154,648 A | 11/2000 | Comer | 455/426 |
| 6,157,823 A | 12/2000 | Fougnies et al. | 455/406 |
| 6,208,851 B1 | 3/2001 | Hanson | 455/405 |
| 6,434,380 B1 * | 8/2002 | Andersson et al. | 455/406 |
| 6,480,591 B1 * | 11/2002 | Penfield et al. | 379/144.01 |
| 6,577,717 B1 * | 6/2003 | Henon | 379/114.01 |
| 6,704,563 B1 * | 3/2004 | Senn et al. | 455/406 |
| 6,959,183 B2 * | 10/2005 | Hutcheson et al. | 455/406 |
| 7,013,127 B2 * | 3/2006 | Wills et al. | 455/406 |
| 2006/0035623 A1 * | 2/2006 | Senn et al. | 455/406 |

FOREIGN PATENT DOCUMENTS

| | | |
|---|---|---|
| DE | 29 47 164 | 11/1980 |
| DE | 34 01 319 | 7/1985 |
| DE | 4312362 | 10/1994 |
| DE | 44 08 655 | 9/1995 |
| EP | 0 048 868 | 4/1982 |
| EP | 0 088 639 | 9/1983 |
| EP | 0 115 240 | 8/1984 |
| EP | 0 128 555 | 12/1984 |
| EP | 0 185 365 | 12/1985 |
| EP | 0 185 365 B1 | 12/1985 |
| EP | 0 461 451 B1 | 12/1991 |
| EP | 0 463 384 | 1/1992 |
| EP | 0 540 234 A2 | 5/1993 |
| EP | 0 546 467 A2 | 6/1993 |
| EP | 0 602 779 | 10/1993 |
| EP | 0 572 991 B1 | 12/1993 |
| EP | 0 589 757 | 3/1994 |
| EP | 0 598 469 | 5/1994 |
| EP | 0 746 135 A2 | 12/1996 |
| EP | 00630165 B1 | 1/2000 |
| FR | 2 575 016 | 6/1986 |
| GB | 2 046 556 | 11/1980 |
| GB | 2 065 353 | 6/1981 |
| GB | 2 141 309 | 12/1984 |
| GB | 2 151 061 | 7/1985 |
| GB | 2 171 877 | 9/1986 |
| GB | 2 215 897 | 9/1989 |
| GB | 2265522 | 3/1992 |
| JP | 48-090110 | 11/1973 |
| JP | 53-039808 | 4/1978 |
| JP | 55-107375 | 8/1980 |
| JP | 57-125567 | 8/1982 |
| JP | 57-125570 | 8/1982 |
| JP | 57-127903 | 8/1982 |
| JP | 58-003367 | 1/1983 |
| JP | 58-165473 | 9/1983 |
| JP | 59-190771 | 10/1984 |
| JP | 60-180270 | 9/1985 |
| JP | 62-054623 | 3/1987 |
| JP | 62-266960 | 11/1987 |
| JP | 02-061786 | 3/1990 |
| JP | 02-079193 | 3/1990 |
| JP | 02-245893 | 10/1990 |
| JP | 03-010457 | 1/1991 |
| JP | 03-024684 | 2/1991 |
| JP | 03-062296 | 3/1991 |
| JP | 04-001891 | 1/1992 |
| JP | 04-043493 | 2/1992 |
| JP | 04-140896 | 5/1992 |
| JP | 4137990 | 5/1992 |
| JP | 04-354092 | 12/1992 |
| JP | 56-101016 | 1/1993 |
| JP | 6070367 | 3/1994 |
| JP | 06-121075 | 4/1994 |
| JP | 09-018609 | 1/1997 |
| NL | 9401004 A | 8/1995 |
| SA | 965074 | 6/1996 |
| UA | 1544542 | 4/1977 |
| WO | WO 91/07833 | 5/1991 |
| WO | WO 93/03585 | 2/1993 |
| WO | WO 93/12606 | 6/1993 |
| WO | WO 95/11576 | 4/1995 |
| WO | WO 95/24107 | 9/1995 |
| WO | WO 95/35619 | 12/1995 |
| WO | WO 96/15633 | 5/1996 |
| WO | WO 99/30480 | 12/1997 |
| WO | WO 98/30037 | 7/1998 |
| WO | WO 98/34393 | 8/1998 |
| WO | WO 98/34425 | 8/1998 |
| WO | WO 98/44716 | 10/1998 |
| WO | WO 98/47112 | 10/1998 |
| WO | WO 00/04701 | 1/2000 |

OTHER PUBLICATIONS

J.S. Somerville, "A New Central Office Facility for Extension Number Billing of PBX Originated Toll Calls".

C. Raymond Kraus, "A Proposed Telephone Identification and Credit System".

Hiroshi Shimizu, Osamu Inoue and Hisakazu Uesaka, "Advanced Free Dial Service," JTR, Jul. 1987, pp. 15 ff.

"ATS Automated Long Distance Telephone Service User's Guide", Oct. 1983, Version 2.0, National Applied computer Technologies.

D.J. Eigen and E.A. Youngs, "Calling Card Service—Human Factors Studies," Bell System Technical Journal, Sep. 1982, vol. 61, No. 7, part 3, pp. 1715 ff.

R.G. Basinger, M. Berger, E.M. Prell, V.L. Ransom and J. R. Williams, "Calling Card Service—Overall Description and Operational Characteristics," Bell System Technical Journal, Sep. 1981, vol. 61, No. 7, part 3, pp. 1655 ff.

Chungming An and Allison B. Mearns, "Direct Dialing of Credit Card Calls," International Conference on Communication, Jun. 14-18, 1981.

Dieter Voegtlen, CP 44—A Modular SPC System for Local, Transit and Trunk Exchanges With Decentralized Processors.

Fukuo Higashiyama and Masaharu Murata, "Credit Call Service," Japan Telecommunications Review, Oct. 1980.

S.D. Lind, "Credit card standards for telecommunications: an historical review," Telecommunication Journal, 1992, vol. 59—IV, pp. 183 ff.

Allison B. Mearns, David J. Miller and Cyrenus M. Rubald, "Calling Card: Dont't tell it—dial it," Bell Laboratories Record, May/Jun. 1982, pp. 117-119.

"Emergence of debit cards brings proposal for universal, compatible numbering system," Banking, Oct. 1976, pp. 19 ff.

Charlie Stimson, "Prepaid Calling Cards—Friend or Foe?, " Public Communications Magazine, Aug. 1994.

IBM Virtual Machine Facility/370: Terminal User's Guide, Release 4 PLC 1.

J.C. Lund, Jr., M.R. Ordun, and R. J. Wojcik, "Implementation of the Calling Card Service Capability—Application of a Software Methodology," IEEE Transactions on Communications, Jun. 1982, vol. COM-30, No. 6, pp. 1297 ff.

S.S. Soo, "Interfacing a Computer to a Telephone Exchange," IBM Technical Disclosure Bulletin, Sep. 1976, vol. 19, No. 4.

Masaharu Kahiara, Ginya Ishiguro, Kiyoshi Teresawa, "Magnetic Card Public Telephone," Review of the Electrical Communications Laboratories, 1984, vol. 32, No. 1.

Lynette Luna, "National Telemanagement answers prepaid wireless dilemmas," RCR Publications Dec. 16, 1996.

W.O. Fleckenstein, "Operations support systems: computer aids for the local exchange," Bell Laboratories Record, Sep. 1982, pp. 185 ff.

"Payment Systems: Europe Steals a Lead in Ship Card System, But They Pose New Problems," Europe Information Service, Sep. 9, 1993.

P. Wible. PHONOCARD®—a pay phone operated by prepaid cards. Sean Millen, "POS and charge cards," Computer Decisions, pp. 40-44.

A.G. Mason, "A Pay-Per-View Conditional Access System for DBS by Means of Secure Over-Air Credit Transmission," Electronics and Computing and Control Divisions of the Institution of Electrical Engineers, International Conference on Secure Communication Systems, Feb. 22-23, 1984.

J.W. Gibbs, T.E. Longden, P.A. Trudgett, "A Small Digital Exchange With Advanced Facilities," ISSS '81 CIC Montreal Sep. 21-25, 1981.

"Smart cards move into everyday use," Computer Management, Mar. 1985.

R.J. Jaeger, Jr., and A.E. Joel, Jr., "System Organization and Objectives," Bell System Technical Journal, Dec. 1970, vol. 49, No. 10, pp. 2417-2443.

J.B. Kerihuel, G.M. Martin, "How the Intelligent Network Will Federate Services Related to Mobility," Third IEE Conference on Telecommunications, The Institution of Electrical Engineers, 1991.

P.D. Bloom and B.L. Breedlove, "The Features Node/Service Interface Concept".

The Market for Central Office Equipment, TE&M Special Report, Dec. 1, 1977, vol. 92, No. 23.

Freeman, "Are prepaid applications 'on the fringe' or infringing?," Intele-Card News, Jan./Feb. 1996.

Harry M. Hall, Christopher D. Carson, Earle H. West, and Lonnie D. Whitehead, "The AT&T Service Circuit Node: A New Element For Providing Intelligent Network Services," AT&T Technical Journal at 72, Summer 1991.

Kevin Hegebarth, "ANI is the key to unlock advanced network services," Telephony, Nov. 14, 1988.

Notes on the BOC INTRA-LATA Networks Prepared by Network Planning Central Services Organization on behalf of the Regional Bell Operating Companies, American Telephone and Telegraph Company, 1980, 1983.

White, James A., "Western Union Buys 50% AirFone Stake; Airlines Sign for In-Flight Phone Service," The Wall Street Journal, Thursday, Dec. 17, 1981.

Alexandra M. Workman, Murthy V. Kollpakam, Janis B. Sharpless, Vilma Stoss, and Hans van der Veer, "International Applications of AT&T's Intelligent Network Platforms," AT&T Technical Journal, Summer 1991.

Simon Wyatt, "Telephone Decrementing Card," Communications International, Jul. 1981.

Krayem-Nevoux, "Payphone Service for Third Generation Mobile Systems," 1993 IEEE, pp. 1708-1712.

"CTIA Products," Telephony, Feb. 23, 1998.

Bauer, "The network of your dreams: Picking the ideal intelligent network infrastructure involves a comprehensive checklist of vendor criteria, including network applications, scalability and reliability," Telephony, Feb. 23, 1998.

Biagi, "The big switch: Intellicall brings its prepaid calling service offering to the U.S.," Telephony, Jul. 20, 1998.

Briere, "Speaking in tongues," Telephony, Feb. 14, 1994, 226(7).

Briere, "Can the RHCs win the long-distance marathon?," Telephony, Feb. 20, 1995, 228(8).

Bucholtz, "In an instant," Telephony, Apr. 20, 1998.

Bucholtz, "High expectations: Electric Lightwave accuses US West of inadequate customer support," Telephony, Jul. 14, 1997.

Bucholtz, "Working in tandem: Five smaller vendors join in end-to-end NT-based customer care architecture," Telephony, Sep. 22, 1997.

Carter, "Asset allocation: Xedia helps service providers provision precious bandwidth," Telephony, Sep. 15, 1997.

Davis, "Heading toward a new Frontier: Fifth-largest U.S. long-distance carrier streamlines for growth," Telephony, Oct. 20, 1997.

Davis, "The gift that keeps on giving: BellSouth targets holiday shoppers for digital phones," Telephony, Nov. 17, 1997.

Davis, "Here comes the smart card is a cashless society reality or rigmarole?," Telephony, Feb. 17, 1997.

Gohring, "Europe sets pace for prepaid: U.S. follows, but only as a last resort," Telephony, 3/2/998.

Gohring, "Lucent adds WIN applications," Telephony, Apr. 6, 1998.

Gohring, "Canadian PCS operators rock the boat," Telephony, Jun. 1, 1998.

Guihat, "An AIN wish list: Multimedia-enhanced services may be the next step for the Advanced Intelligent Network," Telephony, Sep. 22, 1997.

Interim European Telecommunications Standard 300 131.

Kenny, "The anti-bill" Telephony, Jun. 28, 1999.

Langner, "RHCs sail into unfamiliar waters," Telephony, Sep. 19, 1994, 227(12).

Lindstrom, "Prepaid calling cards set to peak," Telephony, Jul. 10, 1995, 229(2).

McElligott, "Prepaid Compaq: BT Cellnet displays intelligent network-based prepay," Telephony, Jun. 5, 2000.

Meyers, "SmarTalk adds PCs to menu," Telephony, Jan. 13, 1997, 232(2).

Meyers, "The best tools for the job," Telephony, Apr. 22, 1996, 230(17).

Meyers, "Improvement, inside and out," Telephony, Apr. 22, 1996, 230(17).

Meyers, "Giving wireless and edge," Telephony, Jul. 22, 1996, 231(4).

Meyers, "Portable potential," Telephony, Jul. 31, 1995, 229(5).

Meyers, "New dog, new tricks, Nortel supplies smarts for Microcell's Fido," Telephony, Aug. 25, 1997.

Meyers, "Sending a message: Unisys opens its wireless platform to more carriers," Telephony, Sep. 22, 1997.

O'Shea, "LHS floats amid PCS chaos," Telephony, Jun. 30, 1997.

O'Shea, "Software deals rule the sky," Telephony, Sep. 15, 1997.

O'Shea, "The business of getting personal: Patent agreement illustrates growing market competition," Telephony, Dec. 1, 1997.

O'Shea, "Services come into operational fold: Prepaid and messaging ride a tidal wave of popularity," Telephony, Mar. 23, 1998.

O'Shea, "After the discovery competition increases in software-based enhanced services," Telephony, Mar. 31, 1997.

O'Shea, "Software, network management drive next wireless era," Telephony, Apr. 22, 1996, 230(17).

O'Shea, "Breaking the mold," Telephony, Jun. 23, 1997.

O'Shea, "Debit cards play the field," Telephony, Aug. 22, 1994, 227(8).

Purton, "Germany tears down wall—and finds an aging network to rebuild," Telephony, Mar. 4, 1991, 220(9).

George Leon, "Smart Card—makes smart sense," Electronic Education, Feb. 1984, vol. 3, No. 6.

"Telecom voices cross continents with messages of progress," Telephony, Feb. 22, 1988, 214(8).

"Vicorp targets global," Telephony, Sep. 1, 1997.

Vittore et al., "Underlying control," Telephony, Jul. 6, 1998.

Ahimovic, Susan M. and Joan M. Michaels.; "Services for Tomorrow's PCS", IEEE Aug. 1993, pp. 222-227.

Ciancetta, M.C., J. Isberg; "Combined personal and terminal mobility in IN environment", Technical Reports, vol. XXII-n. 6- Dec. 1994, pp. 685-696.

Dunogue, J., J.B. Kerihuel, M. Martin; "The Building of Intelligent Networks Architecture and Systems from Alcatel", Commutation & Transmission No. 2—1989, pp. 5-22.

Ghillebaert, B., P. Combescure, A. Maloberti; "Le système cellulaire numérique européen de communication avec les mobiles", L'Echo des Recherces No. 131, 1$^{er}$ trimestre 1988, pp. 5-20.

Jolie, P., G. Mazziotto; "Une application de la carte à microprocesseur: le module d' identité d'abonné du radiotéléphone numérique européen", L'écho des Recherces No. 139, 1$^{er}$ trimestre 1990, pp. 13-20.

Mazziotto, Gérald; "The Subscriber Identity Module For the European Digital Cellular System GSM and Other Mobile Communication Systems", ISS '92, Oct. 1992, vol. 1, pp. 113-116.

Nevoux, R., J.C. Bernard-Dende; "Requirements for Personal Mobility In FPLMTS/UMTS: a view point from the user's expectations", IEEE, 1994, pp. 1-7.

Shimizu, Hiroshi, and Masaki Takahashi; "Intelligent Network", NTTT Review vol. 6, No. 5 Sep. 1994, pp. 67-69.

Söderberg, Lennart; "Evolving an Intelligent Architecture for Personal Telecommunications", Ericsson Review No. 4, 1993, pp. 156-171.

"New Products: Integrated, metered billing," Cellular Business, Jun. 1993.

"Business News: Metered billing set for 1993," Cellular Business, May 1993.

Peter R. Fenner, "Mobil Address Management and Billing for Personal Communications," IEEE at 253 (1992).

Johanna Isberg, "Charging in Cordless Telecommunications Systems," IEEE at 319 (1991).

"Payphone Service for Third Generation Mobile Systems", Rola Krayem-Nevoux, Gerald Mazziotto, and Philippe Hiolle, pp. 1708-1712, 0-7803-0917-0/93, IEEE.

"The Intelligent Network—Changing the Face of Telecommunications," Richard B. Robrock, II, Proceedings of the IEEE, vol. 79, No. 1, Jan. 1991, pp. 7-20.

"International Applications of AT&T's Intelligent Network Platforms," Alexandra M. Workman, Murthy V. Kollpakam, Janis B. Sharpless, Vilma Stoss, and Hans van der Veer, AT&T Technical Journal, Summer 1991, pp. 44-84.

"The Evolution of Global Intelligent Network Architecture," George Y. Wyatt, Alvin Barshefsky, Robert V. Epley, Marc P. Kaplan, and Krish P. Krishnan, AT&T Technical Journal, Summer 1991, pp. 11-25.

"Managing the Network Revenue Stream," David E. Klepp, "Telephony," Nov. 29, 1993, pp. 32-33.

"Information Systems: Hooking up to the Network," Dan Merriman, Cellular Business, Nov. 1992, pp. 18, 20-21, 78, and 80.

* cited by examiner

SYSTEMS AND METHODS FOR PRERATING COSTS FOR A COMMUNICATION EVENT

CLAIM OF PRIORITY

This application is a continuation application of U.S. Ser. No. 09/371,176, filed Aug. 11, 1999 and now U.S. Pat. No. 6,704,563, which claims priority to U.S. patent application Ser. No. 60/096,065, filed 11 Aug. 1998, the contents of all of which are hereby incorporated by reference.

BACKGROUND

As cellular communication services have become increasingly available and common, traditional methods of receiving payment for cellular services have been found lacking. Commonly, services are rendered to a customer and at the end of a set period, a bill is sent to the customer for the services rendered during that period. This essentially amounts to extending credit to the customer. For traditional, residential telephone customers, service can easily be terminated for non-payment of such bills because the offender is easily identified and is in a fixed location. Cellular communication customers, however, have been able to evade payment of such bills by seeking service from a new provider when prior service has been terminated. The cycle can continue in this fashion, with each successive provider losing money to such customers.

Prepayment for cellular services is being widely embraced as a solution to this problem. Using this system, a customer provides money to a service provider in advance of the rendering of communication services. Service charges are then deducted from the customer's balance until the prepayment is depleted. Unlike many services, though, the costs of telephone communication are often a complex conglomeration of fees based on a wide array of factors, such as connection charges, surcharges, taxes, and other charges. Furthermore, many of these factors can vary widely, even during a single connection, based on conditions such as the time of day, the locations of the calling parties, volume discounts, and other variables. For example, a cellular communication device may move from one calling area to another resulting in a substantial change in the rate. Such factors make determining the quantity of service available for a fixed, prepaid amount a complex endeavor.

One solution currently in use is to determine, on a minute-by-minute basis, the accumulated service charge and compare this amount to the amount of prepayment as described in U.S. Pat. No. 5,722,067, incorporated herein by reference. This technique, however, requires a considerable amount of processing support for the repeated calculations, because once each minute, the cost of the previous minute must be calculated, deducted from the available balance. Furthermore, the depletion of the balance must be monitored in order to notify the caller when the call will be terminated. A method for reducing the processing necessary to meter service would greatly reduce the costs associated with providing communication services to prepaid callers.

SUMMARY

The systems and methods described herein may be used to meter communications services under a prepayment plan, for example, by determining, upon initiation of a communication event, a duration for that event for which the cost will be approximately equal to a prepaid balance. In this way, services can be terminated at the end of the duration, thereby preventing charges in excess of the prepaid balance without requiring repeated calculations during the communication event.

In one aspect, the systems and methods described herein relate to a process for metering a communication event by identifying an initiation of a communication event, identifying an account balance associated with the communication event, determining a duration of the communication event for which an accrued cost of the communication event is approximately equal to the account balance.

A signal for identifying an initiation of a communication event may include information representative of the identity of the user initiating the communication event, such as the originating phone number, an automated number identification code (ANI), equipment identification number (EIN), or mobile identification number (MIN), the time at which the event was initiated, the location from which the event was initiated, the recipient of the event, such as a dialed number identification system code (DNIS), the location of the recipient of the event, the distance between the user and the recipient, the service provider handling the event, or any other information. Such information may be used to identify an associated account balance, or an additional input, such as a calling card number or coupon number may be received. An account balance, as the term is used herein, refers to a prepaid amount of money which may be applied to defray the cost of a communication event.

In one practice, determining a duration includes identifying, upon initiation of the communication event, a rate schedule for the communication event. A rate schedule, as the term is used herein, refers to an aggregate charge representative of the total cost of a communication event, and may include fixed amounts, rates per unit time, or any other type of fee. In one practice, identifying a rate schedule includes determining a connection charge rate and a tax charge rate. In certain practices, identifying a rate schedule further includes determining a factor selected from available free time, endpoints of the communication event, distance of the communication event, and time of day. In one practice, identifying a rate schedule for the communication event includes determining a cost per second rate.

In one practice, the process includes terminating the communication event at the end of the determined duration. In another practice, the process includes deducting a cost of the communication event from the available balance upon termination of the communication event.

In one practice, identifying an initiation of a communication event includes identifying an initiation of a telephone call, such as a cellular telephone call. In certain practices, identifying an account balance includes an act selected from receiving an account code from a user, receiving an account code from a recipient, identifying a device receiving the communication event, and identifying a device initiating the communication event.

The systems and methods described herein also provide a system for metering a communication event, including a communication interface to receive information representative of initiation of a communication event, a database coupled to the communication interface to store information associated with a plurality of accounts, and a processor coupled to the database to identify an account balance associated with the communication event and to determine a duration of the communication event for which an accrued cost of the communication event is approximately equal to the account balance.

In one embodiment, the processor includes a rate mechanism to determine a duration, upon initiation of the event by identifying and employing a rate schedule for the communication event. A rate mechanism may be any calculation or strategy for determining the rate scehdule or aggregate charge on the basis of a plurality of individual charges, which may include fixed fees, rate-per-time charges, or other fees. In one embodiment, the rate mechanism includes means for identifying a rate schedule by determining at least a connection charge rate and a tax charge rate. In certain embodiments, the rate mechanism further includes means for determining at least one factor selected from available free time, endpoints of the communication event, distance of the communication event, and time of day. In one embodiment, the rate schedule for the communication event includes a cost per second rate.

In certain embodiments, the system further comprises a transmitter to send a signal for terminating the communication event at the end of the determined duration. In certain embodiments, the communication event is a telephone call. In one embodiment, the telephone call is initiated by a cellular telephone.

In certain embodiments, the processor includes means for identifying an account balance by a method selected from receiving an account code from a user, receiving an account code from a recipient, identifying a device initiating the communication event, and identifying a device receiving the communication event.

In yet another embodiment, the systems and methods disclosed herein relate to a system for regulating prepayment for a mobile communication event, including a first database to store information representative of rate plans for a plurality of communication service providers, a second database to store information associated with a plurality of accounts, a communication interface to receive information representative of initiation of a communication event, a processor coupled to the first database, the second database, and the communication interface to identify an account balance associated with the communication event and to determine, upon initiation of the communication event, a duration of the communication event for which an accrued cost of the communication event is approximately equal to the account balance.

In certain embodiments, the rate plans include cost per second rates. In one embodiment, the processor includes a rate mechanism to determine a duration, upon initiation of the event by identifying and employing a rate schedule for the communication event. In one such embodiment, the rate mechanism includes means for identifying a rate schedule by determining at least a connection charge rate and a tax charge rate. In certain embodiments, the rate mechanism further includes means for identifying a rate schedule by determining at least one factor selected from available free time, endpoints of the communication event, distance of the communication event, and time of day.

In certain embodiments, the system further includes a transmitter to send a signal for terminating the communication event at the end of the determined duration. In certain embodiments, the communication event is a telephone call. In one embodiment, the telephone call is initiated by a cellular telephone.

In certain embodiments, the processor includes means for identifying an account balance associated with the user. In certain embodiments, the processor includes means for identifying an account balance associated with the recipient.

In another practice, the systems and methods described herein provide a method for regulating prepayment for a mobile communication event by storing information representative of rate plans for a plurality of communication service providers, storing information associated with a plurality of user accounts, identifying an initiation of a communication event, identifying an account balance associated with the communication event, and determining, upon initiation of the communication event, a duration of the communication event for which an accrued cost of the communication event is approximately equal to the account balance, as a function of the service provider handling the communication event.

In certain embodiments, storing information representative of rate plans includes storing cost per second rates.

In certain embodiments, the method further includes identifying a transfer of service from a first service provider to a second service provider, and determining a duration of the communication event for which an accrued cost of the communication event is approximately equal to the account balance, as a function of the second service provider handling the communication event.

In certain embodiments, determining a duration includes identifying, upon initiation of the communication event, a rate schedule for the communication event. In one embodiment, identifying a rate schedule includes determining a connection charge rate and a tax charge rate.

In certain embodiments, identifying a rate schedule further includes determining a factor selected from available free time, endpoints of the communication event, distance of the communication event, and time of day.

In certain embodiments, the method includes terminating the communication event at the end of the determined duration. In other embodiments, the method includes comprising deducting a cost of the communication event from the available balance upon termination of the communication event.

In certain embodiments, identifying an initiation of a communication event includes identifying an initiation of a telephone call. In one embodiment, identifying an initiation of a communication event includes identifying an initiation of a cellular telephone call.

In certain embodiments, identifying an account balance includes an act selected from receiving an account code from a user, and identifying a device initiating the communication event.

In certain embodiments, identifying an account balance includes an act selected from receiving an account code from a recipient, and identifying a device receiving the communication event.

BRIEF SUMMARY OF THE FIGURES

The following figures depict certain illustrative embodiments of the invention in which like reference numerals refer to like elements. These depicted embodiments are to be understood as illustrative of the invention and not as limiting in any way.

DESCRIPTION

The description below pertains to several illustrative embodiments of the invention. Although many variations of the systems and methods may be envisioned by one skilled in the art from a review of the illustrative embodiments, such variations and improvements are intended to fall within the compass of this disclosure. Thus, the scope of the invention is not to be limited in any way by the disclosure below.

The systems and methods described herein are useful for metering communications services provided under a prepayment plan, for example, by determining, upon initiation of a communication event, a duration for that event which results in a cost for that event approximately equal to a prepaid balance. In this way, services can be terminated at the end of the duration to prevent charges in excess of the prepaid balance without requiring repeated calculations during the communication event.

Figure 1:
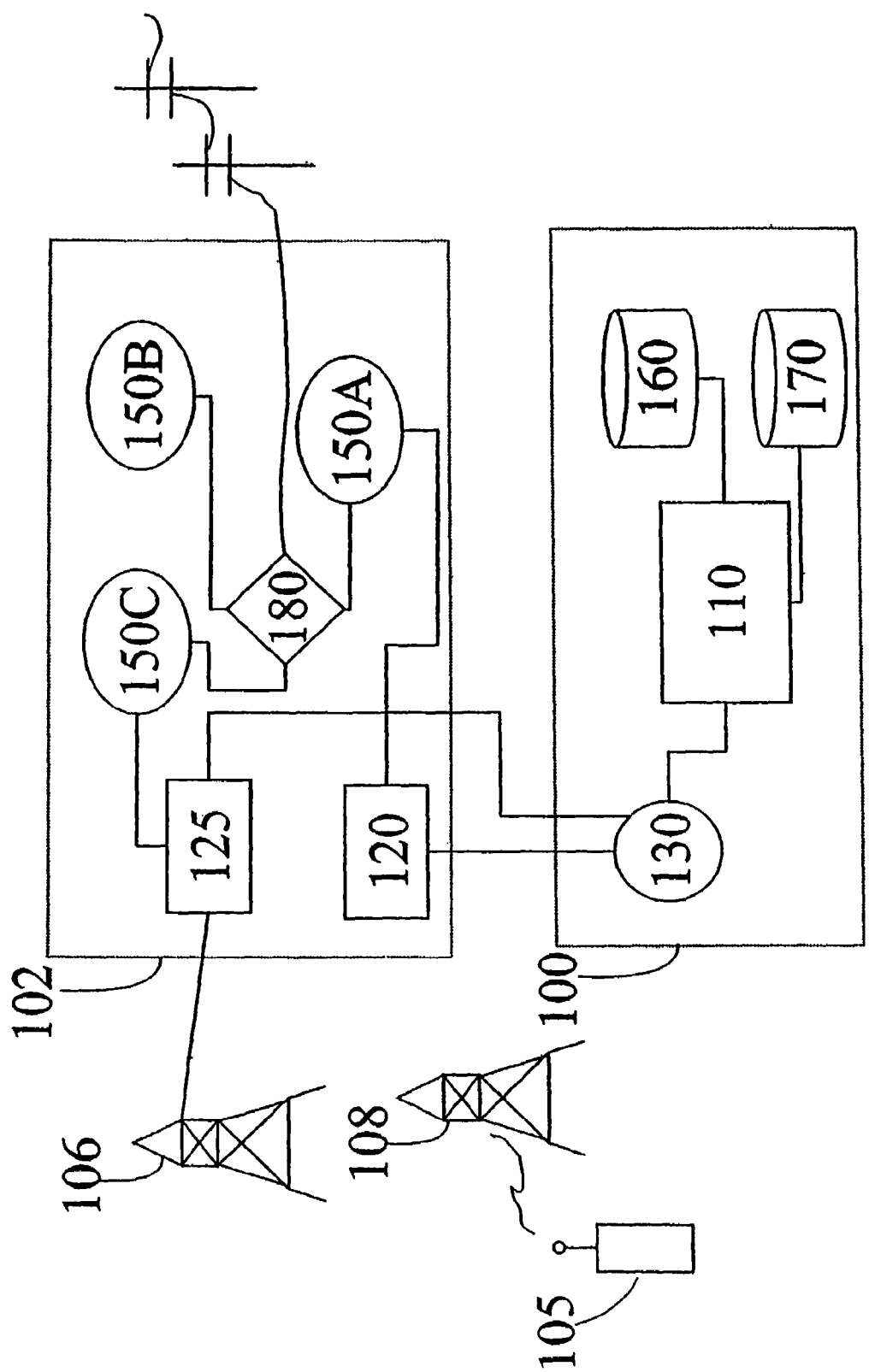
FIG. 1 depicts a centralized system for metering communication services.

FIG. 1 depicts an overview of one system according to the invention for regulating the prepayment of a mobile cellular telephone call over a cellular network. Specifically, FIG. 1 depicts a prepayment system 100 that communicates with a communications network 102, such as a cellular communications network. The cellular network 102 may include cellular antenna 108 linked to cellular switch 120. Cellular switch 120 further may be connected to cellular service provider 150A connected to the local exchange carrier (LEC) 180. A second cellular antenna 106 may be linked to a cellular switch 125 of a second cellular service provider 150C connected to the LEC 180.

The depicted prepayment system 100 can include a data processing platform, or processor, 110, databases 160 and 170 and a communication interface 130. As illustrated in FIG. 1, the prepayment system 100, including processor 110, databases 160 and 170, and communication interface 130 may be connected to cellular switches 120 and 125 or to any other component suitable for executing the functions described below. The depicted data processor 110 can be a conventional data processing platform such as an IBM PC-compatible computer running the Windows NT operating systems, or a SUN workstation running a Unix operating system. Alternatively, the data processor 110 can comprise a dedicated processing system that includes an embedded programmable data processing system. For example, the data processor 110 can comprise a single board computer system that has been integrated into the cellular switch 125 of the communications network 102. The single board computer (SBC) system can be any suitable SBC, including the SBCs sold by the Micro/Sys Company, which include microprocessors, data memory and program memory, as well as expandable bus configurations and an on-board operating system.

The depicted databases 160 and 170 may store information associated with a plurality of accounts, such as account balances, and information representative of rate plans for a plurality of communication service providers, respectively. It will be understood by those of ordinary skill in the art that the depicted databases can be any suitable database systems, including the commercially available Microsoft Access database. The databases 160 and 170 can be implemented as local or distributed database systems, and the design and development of suitable database systems follows from principles well known in the are including those set forth in McGovern et al., *A Guide To Sybase and SQL Server*, Addison-Wesley (1993). The databases 160 and 170 can be supported by any suitable data memory device, such as a hard disk drive, RAID system, tape drive system, floppy diskette, or any other suitable system. The system depicted in FIG. 1 includes database devices that are separate from the processor 110, however, it will be understood by those of ordinary skill in the art that in other embodiments the database devices 160 and 170 can be integrated into the processor 110, or into another component of the system.

The communication interface 130 can be any suitable interface, including those of the type capable of receiving and delivering a call over a communication network. The communication interface 130 can interface with the PSTN, T1 lines, optical transmission lines, IP lines, cellular transmission stations or any other medium employed for carrying communications over a network. In the embodiment depicted in FIG. 1 the communication interface is depicted as separate from the processor 110, however, it will be understood by those of ordinary skill that the interface 130 can be integrated into the processor 110.

To initiate a call, the cellular telephone 105 may transmit a signal including an identification code, such as a mobile identification number (MIN) or automated number identification code (ANI), of the cellular telephone 105 and a dialed number identification system code (DNIS) to antenna 108, which transmits the signal to cellular switch 120. Cellular switch 120 may forward the call or the signal to prepayment system 100, or may identify, for example, on the basis of the MIN or DNIS, those calls associated with a prepayment plan and forward those calls to prepayment system 100. Calls may be directed to prepayment system 100, e.g., via T1 land lines or cellular retransmission.

A signal received by communication interface 130, such as an IP or T1 line, may be sent to processor 110. Processor 110 may execute a process that can authenticate the MIN and DNIS.

This process can be a software program executing on the processor 110, which configures the processor to operate as a system according to the invention. Such a process can be implemented as a C language computer program, or a computer program written in any high level language including C++, Fortran, Java or Basic. Additionally, in an embodiment where the processor is a single board computer or a microcontroller, the process can be realized as a computer program written in microcode or written in a high level language and compiled down to microcode that can be executed on the target platform. The implementation of a system or process as described herein follows from principles well known in the art and these general principles for high level programming are known, and set forth in, for example, Stephen G. Kochan, Programming in C, Hayden Publishing (1983).

Upon recognition of the MIN, the processor may connect to a database 160 to identify an account associated with the MIN. The user account may indicate a rate plan selected by the user. For example, a service provider may offer two rate plans, one of which offers high rates, and the other of which offers low rates, but charges a fixed monthly fee. The selected rate plan thus assists in determining the cost of the communication event. Similarly, the user account may indicate that the user receives ten free minutes of connection, which again may affect the determination of the cost of the communication event.

A user account may also indicate an available balance associated therewith, representative of an amount of money paid by the user to a service provider in advance of a request for service. Thus, the user account may be used to identify an available balance associated with the communication event. In certain embodiments, a signal may be received that is indicative of a separate account having an available balance. For example, a user initiating a telephone call may also dial the number of a prepaid phone card or coupon. This number may be associated, for example, with an account having an available balance of an amount, e.g., $10, for which the phone card was purchased. In certain embodiments, charges may accrue, additionally or alternatively, to the recipient of the communication event, e.g., for a collect call, or for a recipient using a cellular telephone. In such embodiments, an available balance associated with the recipient may also be considered by the systems and methods described herein. Additional techniques for identifying an available balance associated with a communication event are known in the art and may be employed in the systems and methods described herein without departing from the scope and spirit of the systems and methods described herein.

Upon recognizing that the available balance is sufficient to fund a communication event, the processor 110 may outpulse the DNIS to the public service telephone network (PSTN) through LEC 180. Additional systems for implementing the above process or variants thereof, e.g., using analogous telecommunications systems, will be known to those of skill in the art and are intended to fall within the scope of the present disclosure.

Additional information, such as the service provider handling the communication event, may be useful in determining the rate schedule associated with the communication event. For example, in one embodiment, antenna 108 may be associated with service provider 150A. Thus, a signal may be received by system 100 indicating that service provider 150A is handling the communication event. Processor 110 may then consult database 170, which may include information for a plurality of service providers including information relating to rate plans and other relevant data, to retrieve information useful for determining a rate schedule for the communication event.

The process executing on processor 110 may then determine a rate schedule for the communication event. A number of variables and conditions may be considered and analyzed in order to determine a rate schedule. For example, a connection rate may be determined, e.g., a charge per unit time for maintaining the communication event. The connection rate may be an aggregate of multiple charges, e.g., a fixed amount or rate for an initial period and a rate for time after the initial period. For example, a connection rate may include an amount of one dollar for the first minute and a rate of one cent per second thereafter. The rate may be dependent on the time of day and/or day of the week. For example, a rate may be ten cents per minute from midnight to noon, fifteen cents per minute from noon to midnight, and five cents per minute on Saturday. Furthermore, a rate may change during a connection, for example, as a function of the time of day, day of the week, or other factor. Thus, a call placed at 11:30 pm may begin at a rate of ten cents per minute changing to twelve cents per minute at midnight. The connection rate may further be influenced by the distance between the user and the receiver. For example, a rate may be one cent per second between Paris, France and Athens, Greece and two cents per second between Paris, France and Sydney, Australia.

Furthermore, cellular or mobile communication systems may charge an additional fee or rate for a connection in addition to charges for a non-wireless connection. Such rates or fees may be affected by variables such as those discussed above.

Additional charges that may be included in the rate schedule include taxes, fixed fees, or other charges. Fixed fees may include service fees, for example, for using a special feature such as automatic redial or callback, a fee for establishing a connection, or any other fee associated with the communication event. Taxes may include fixed fees, a tax rate, or both.

The rate schedule may further be affected by a rate plan provided to the user. For example, the user may subscribe to a rate plan which offers a fixed connection rate for all times and distances instead of a plan which charges variable rates based on such conditions. The rate plan may provide additional conditions. For instance, the user may be allotted ten free minutes each month, or may receive a discount on calls in excess of thirty minutes per month.

The rate schedule may be used by processor 110 to determine, upon initiation of the communication event, a duration of the communication event for which the accrued charges will be approximately equal to an available balance in an account associated with the communication event. In one exemplary embodiment, a time t may be determined for the following equation such that the equation is satisfied:

$$[\text{available balance}] = t[\text{connection rate}] + [\text{fixed fees}] + t[\text{wireless connection rate}] + [\text{taxes}]$$

In another exemplary embodiment, time t may be divided into periods x, y, and z, for example, wherein x represents an amount of time at an initial rate, y represents an amount of time at a first rate, and z represents an amount of time at a second rate. For example, y may represent an amount of time at an 'evening' rate, and z may represent an amount of time at a 'night' rate. Thus, an equation such as the following may be used to determine a time t=x+y+z for which the cost of the communication event is approximately equal to an available balance in an account associated with the communication event:

$$[\text{Available balance}] = x[\text{InitRate}] + y[\text{EveRate}] + z[\text{NightRate}] + t[\text{WirelessRate}] + [\text{Fixed Fees}] + [\text{Taxes}]$$

In certain embodiments, time t may be increased by a number n representative of a number of free minutes available to the user.

In certain embodiments, the taxes may be variable based on the cost of the communication event as a whole. For example, a communication event may be taxed at a 5% rate. Thus, an appropriate equation for determining t may be represented by the following exemplary formula:

$$[\text{available balance}] = 1.05 * (t[\text{connection rate}] + [\text{fixed fees}] + t[\text{wireless connection rate}])$$

Many variations on the above schemes suited to particular circumstances, rate schedules, and other conditions can be developed to suit a particular application and such variations will be apparent to those of skill in the art and may be employed in the systems and methods described herein.

The duration may be reevaluated by process running on processor 110 during the course of the communication event, such as upon the change of a factor which influences the cost of the communication event. For example, the user may, during the course of the communication event, add an additional party to the communication event, such as in a conference call. Because charges associated with the additional party were not evaluated in earlier determinations, the determined duration does not reflect these additional charges. Reevaluation of the duration may result in a shortened maximum duration of the communication event in light of the additional party. Furthermore, a user employing a mobile communication system may travel to a different area, for example, which is serviced by a different service provider operating under a different rate plan, or which results in a shorter distance between the user and the recipient, possibly resulting in an decreased connection rate. Reevaluation may include deducting accrued charges from the available balance prior to determining a new duration for the communication event.

Furthermore, system 100 may terminate a communication event when the determined duration is reached, thereby preventing the communication event from incurring fees in excess of the funds available in the available balance. System 100 may send signals, such as voice messages or beeps, to the user, the recipient, or both prior to termination, e.g., one minute before termination, as a warning that the available balance is nearly consumed.

In one embodiment, mobile cellular telephone 105 may travel from a location served by antenna 108 to a region served by antenna 106, associated with a second cellular switch 125 and a second service provider 150C. As the transfer occurs, a signal may be sent to system 100 indicative of the change in service provider. Processor 110 may then consult database 170 as described above and determine an updated rate schedule for the call. Processor 110 may then reevaluate the duration of the communication event for which the accrued cost of the communication event will be approximately equal to the available balance.

Figure 2:
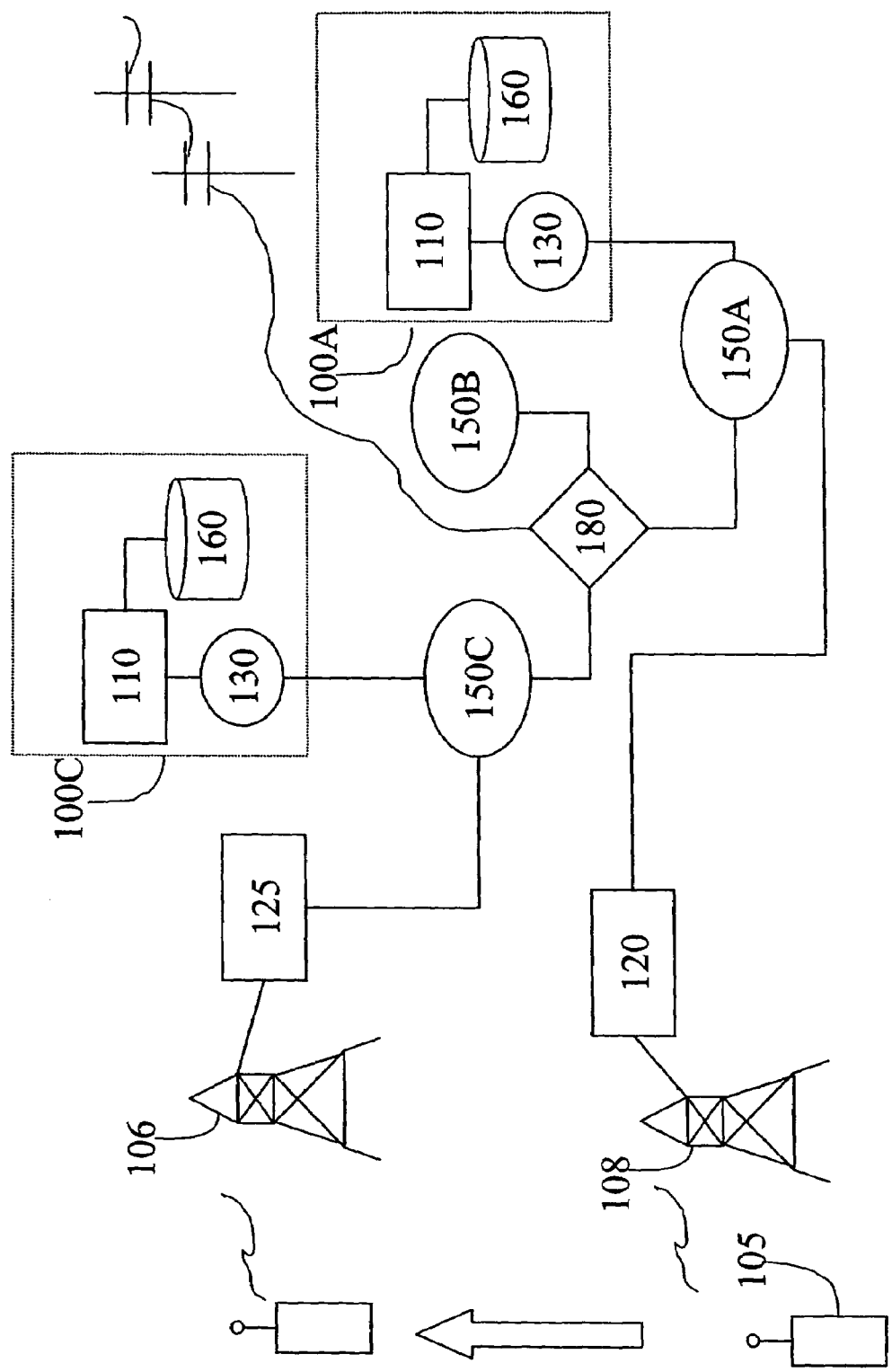
FIG. 2 shows a decentralized system where separate service providers employ separate prepayment systems.

As described above, prepayment system 100 may provide a centralized service to a plurality of service providers. Alternatively, as shown in FIG. 2, each service provider offering a prepayment plan, e.g., 150A and 150C, may have a prepayment system 100 associated with it, rather than using a centralized metering service. In such embodiments, calls routed to a particular service provider 150A may be regulated, as described above, by a prepayment system 100A particular to that service provider. Upon transfer to a second service provider 150C, the first prepayment system 100A may deduct accrued charges from the available balance and provide the updated available balance to the second prepayment system 100C. Variations and modifications of these systems will be apparent to those of skill in the art and are intended to fall within the scope of the present disclosure.

For example, with reference to FIG. 2, a communication event involving cellular telephone 105 may be received by antenna 108 and directed to cellular switch 120 and corresponding service provider 150A. Service provider 150A may use prepayment system 100A to regulate the duration of calls handled by service provider 150A, terminating calls when an available balance is depleted. When cellular telephone 10S travels to a region serviced by antenna 106, which directs transmissions to cellular switch 125 and corresponding service provider 150C, service provider 150A may transfer the communication event to service provider 150C, which uses prepayment system 110C to regulate the duration of calls.

To facilitate the transfer, prepayment system 100A may determine the accrued cost of the communication event, deduct this amount from the available balance, and transmit the updated available balance to service provider 150C and prepayment system 100C. Alternatively, prepayment system 100A may transmit the accrued cost of the communication event and the original available balance to service provider 150C and prepayment system 110C, thereby permitting prepayment system 100C to reevaluate the duration of the communication event.

Figure 3:
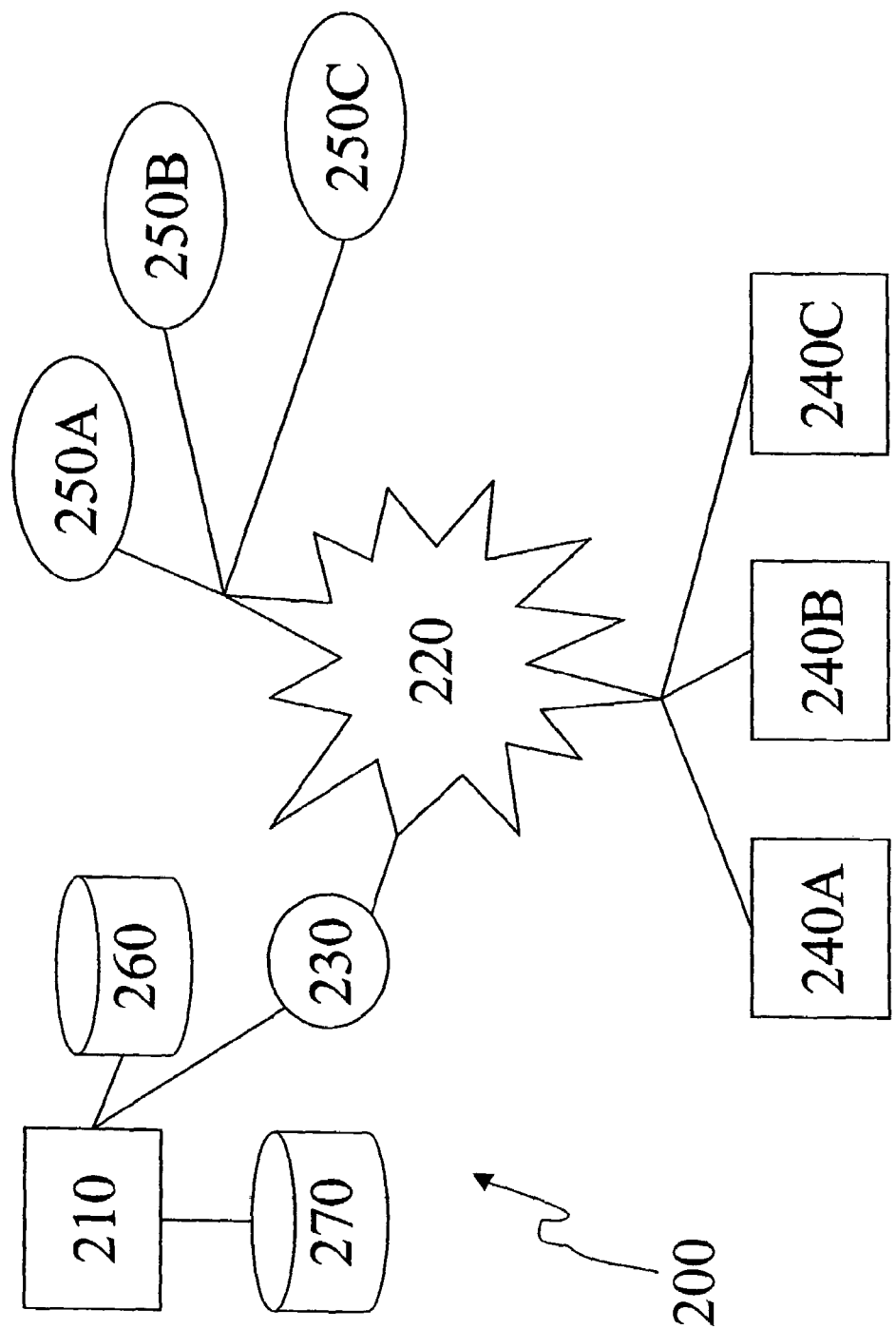
FIG. 3 presents an embodiment of a prepayment system capable of servicing communication events on a network; and, FIG. 4 depicts a flowchart of a method for metering communication services.

Another embodiment of the instant system which services communication events over a network, such as the Internet, a PSTN, or any other suitable network, is described by FIG. 3. Such a system 200 may include a processor 210 coupled to databases 260 and 270 and a communication interface 230. The communication interface may be coupled through a network 220 to a plurality of communication devices 240A-C and one or more service providers 250A-C. Other configurations of the above components which permit a system to perform the functions described herein will be apparent to one of ordinary skill in the art and are considered to fall within the scope of the present disclosure.

In this embodiment, communication device 240A, such as a fax machine, telephone, modem, or any other communication device, may initiate a communication event with device 240B. A signal representative of the initiation of the communication event may be received by communication interface 230 and transmitted to processor 210. The signal, or a subsequent associated signal, may include information associated with the communication event. For example, the signal may include a code representative of device 240A or 240B, such as phone numbers, an account code, or any other code useful for associating an account with the communication event. Processor 210 may then search a database 260 containing information associated with a plurality of accounts to identify an account associated with the communication event. The account may be associated with an available balance representing a sum of money provided in advance of requesting or receiving communication services.

Processor 210 may then determine a rate schedule for the communication event by any method in the art, for example, by using techniques outlined above. In one embodiment, a signal is received by system 200 indicative of a service provider 250A handling the communication event. Processor 210 may then consult database 270, which may include information for a plurality of service providers including information relating to rate plans and other suitable data, to retrieve information useful for determining a rate schedule for the communication event.

Processor 210 may then determine, for example, as described above, based on the rate schedule and the available balance, a duration for the communication event such that the accrued cost of the communication event will be approximately equal to the available balance. The duration may be reevaluated during the course of the communication event, such as upon the change of a factor which influences the cost of the communication event, as described above. The change of a factor may be detected, for example, by receiving a signal, e.g., a signal indicating a change in service provider, or by querying a system, such as a service provider or a cellular switch, to determine the current conditions and comparing these conditions to previously determined conditions. Furthermore, system 200 may terminate a communication event when the determined duration is reached, thereby preventing the communication event from incurring fees in excess of the funds in the available balance.

Figure 4:
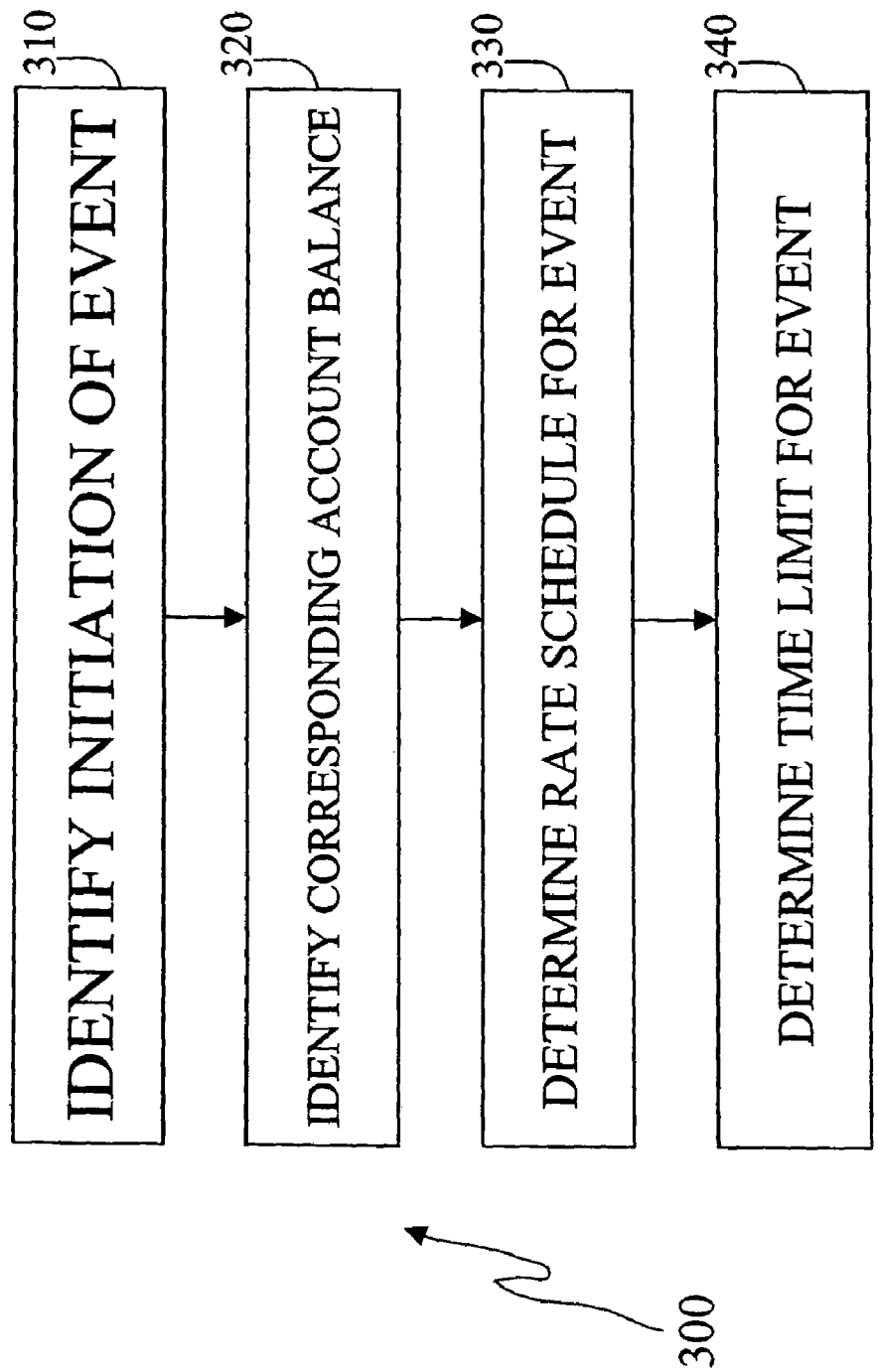

A method for metering communication services is shown in FIG. 4. The method 300 may comprise identifying the initiation of a communication event 310, identifying an account balance associated with the communication event 320, determining a rate schedule for the communication event 330, and determining a time limit for the event 340. The time limit may be determined by calculating a duration of the communication event for which the accrued cost will be approximately equal to the account balance.

Identifying the initiation of a communication event 310 may include receiving a signal indicating the initiation of a communication event. Such a signal may include information representative of the identity of the user initiating the communication event, such as the originating phone number, an automated number identification code (ANI), equipment identification number (EIN), or mobile identification number (MIN), the time at which the event was initiated, the location from which the event was initiated, the recipient of the event, such as a dialed number identification system code (DNIS), the location of the recipient of the event, the distance between the user and the recipient, the service provider handling the event, or any other information. Such information may be used to determine a number of parameters of the communication event.

For example, information representative of the time at which the event was initiated may be useful in determining the cost of the communication event, because certain rate plans may offer decreased rates at certain times, e.g., at night or on weekends. The time of initiation may alternatively be determined by recording the time at which an initiation signal is received. The distance of the communication event, or the locations of the user and the receiver, may also affect the cost of the communication event, because rates may, for example, be higher for events taking place over longer distances.

The information may be used to identify an account and an available balance associated therewith 320. The account may be a user account, may be associated with a phone card or coupon, or may be any other prepaid account balance, as will be apparent to one of skill in the art.

In certain embodiments, charges may accrue to the recipient of the communication event, e.g., alternatively or additionally. For example, a recipient receiving a telephone call on a cellular telephone may be charged at a certain rate for the duration of the connection. Similarly, the recipient may receive a collect call, and thus assume responsibility for the charges associated with the call. Thus, upon identification of the initiation of a communication event, an account balance may be identified for the recipient, a rate schedule may be determined for the recipient, and a duration of the communication may be determined, upon initiation of the communication event, for which the accrued charges will be approximately equal to an available balance in an account associated with the communication event. The communication event may be terminated at the end of the determined duration. These functions may be performed as described above.

Determining a rate schedule for the communication event 330 may be accomplished by the techniques outlined above, for example, by considering the location of the communication parties, the time of day, the rate plan, or other relevant information. Additional methods for determining a rate schedule for particular situations and conditions will be apparent to those of skill in the art and may be employed in the systems and methods described herein without departing from the scope and spirit thereof. The rate schedule may then be used to determine a time limit for the communication event 340, for example, by using techniques outlined above to determine a duration of the communication event for which the accrued cost will be approximately equal to the available balance.

In certain embodiments, the duration of the communication event may be reevaluated because of a change in one or more of the factors which influence the cost of the communication event. Thus, the method may include identifying a change in the service provider handling the communication event and reevaluating the duration of the communication event to reflect the change in these conditions and to more accurately determine the time at which the cost of the communication event will be approximately equal to the available balance.

The communication event may continue for the determined duration, at which point the communication event may be terminated to avoid incurring charges in excess of the available balance. Prior to termination, the user, the recipient, or both, may be notified of the impending termination, e.g., one minute before termination. Alternatively, if the user terminates the communication event prior to the determined duration, an accrued charge may be determined for the services rendered and this charge may be deducted from the available balance.

While the invention has been disclosed in connection with the embodiments shown and described in detail, various equivalents, modifications, and improvements will be apparent to one of ordinary skill in the art from the above description. For example, the systems and methods described above may be modified for use with different networks, such as ISDN, PBX, or the Internet, may be configured into integrated systems, or may be applied to related fields where analogous metering may be advantageous. Such equivalents, modifications, and improvements are intended to be encompassed by the following claims.

What is claimed is:

1. A method, comprising:
   identifying a monetary account balance associated with a request for a communications event,
   associating a rate plan with the request, the rate plan being associated with at least two predetermined connection rates, each of the at least two connection rates defining the respective relationship between services provided by a communications service provider and the fees retained by the communications service provider in exchange therefor,
   computing a rate schedule based on the rate plan, and
   determining a maximum allowable duration of the communications event by comparing the rate schedule to the monetary account balance.

2. A method according to claim 1, wherein associating a rate plan with the request further includes associating a tax charge rate.

3. A method according to claim 1, wherein computing a rate schedule includes incorporating at least one of: an initial rate period, at least one fixed fee, available free time, and a cost per second for the communications event.

4. A method according to claim 1, wherein the request includes an initiation of a telephone call.

5. A method according to claim 1, wherein the request includes an initiation of a cellular telephone call.

6. A method according to claim 1, wherein identifying a monetary account balance associated with the request includes at least one of:
   receiving an account code from a user,
   receiving an account code from a recipient,
   identifying a device receiving the communications event, and
   identifying a device initiating the communications event.

7. A method according to claim 1, further comprising authorizing completion of the communications event for the determined duration.

8. A method according to claim 7, wherein authorizing completion of the communications event includes terminating a telephone call at a switch.

9. A method according to claim 7, wherein authorizing completion of the communications event includes terminating a cellular telephone call at a cellular switch.

10. A method according to claim 1, wherein comparing the rate schedule to the monetary account balance includes determining a duration of the communications event for which an accrued cost of the communications event is approximately equal to the monetary account balance.

11. A method according to claim 1, wherein computing a rate schedule includes incorporating at least one of: an initial rate period and fixed fees.

12. A method according to claim 1, wherein computing a rate schedule includes at least one of:
   computing endpoints of the communications event,
   determining a distance of the communications event,
   considering time of day of the communications event, and,
   considering day of week of the communications event.

13. A method according to claim 1, further comprising,
   monitoring the communications event for a rate schedule altering event, and computing an updated rate schedule upon determining the occurrence of the rate schedule altering event.

14. A method according to claim 13, further comprising, updating the monetary account balance before the rate schedule altering event, and
computing an updated duration of the communications event by comparing the updated monetary account balance and the updated rate schedule.

15. A method according to claim 13, wherein monitoring the communications event includes determining that a number of parties to the communications event has changed.

16. A method according to claim 15, wherein determining that a number of parties to the communications event has changed, includes determining that a new party is added to the communications event.

17. A method according to claim 13, wherein monitoring the communications event includes determining a 18. A system, comprising:
at least one communications interface to receive information representative of a request to initiate a communications event,
at least one database to store:
information representative of rate plans for a plurality of communications service providers, each rate plan associated with at least two predetermined connection rates, each of the at least two connection rates defining the respective relationship between services provided by a communications service provider and the fees retained by the communications service provider in exchange therefor, and
information associated with a plurality of accounts, and
at least one processor coupled to the at least one database and the at least one communications interface, to identify a monetary account balance associated with the request, to associate a rate plan with the request, to compute a rate schedule based on the at least two connection rates from the associated rate plan, and to compare the rate schedule to the monetary account balance to determine a maximum allowable duration for which an accrued cost of the communications event is approximately equal to the monetary account balance.

19. A system according to claim 18, wherein the at least one processor includes instructions to determine a tax charge rate.

20. A system according to claim 18, wherein the rate schedule includes at least one of: an initial rate period, at least one fixed fee, available free time, and a cost per second for the communications event.

21. A system according to claim 18, further comprising a transmitter to send a signal for terminating the communications event at the end of the determined duration.

22. A system according to claim 18, wherein the communications event is a telephone call.

23. A system according to claim 18, wherein the communications event is a cellular telephone call.

24. A system according to claim 18, wherein the at least one processor includes instructions for identifying a monetary account balance, said instructions to perform at least one of:
receive an account code from a user,
receive an account code from a recipient,
identify a device initiating the communication event, and,
identify a device receiving the communication event.

25. A system according to claim 18, wherein the rate schedule includes at least one of: an initial rate period, fixed fees, available free time, and a cost per second for the communications event.

26. A system according to claim 18, wherein the at least one processor includes instructions to determine at least one of:
endpoints of the communications event,
a distance of the communications event,
time of day of the communications event, and,
day of week of the communications event.

27. A system according to claim 18, where the at least one processor includes instructions to:
monitor the communications event for a rate schedule altering event, and
update the rate schedule upon the occurrence of the rate schedule altering event.

28. A system according to claim 27, wherein the at least one processor includes instructions to:
update the monetary account balance before the rate schedule altering event, and
compute an updated duration of the communications event by comparing the updated monetary account balance and the updated rated schedule.

29. A system according to claim 27, wherein the instructions to update the rate schedule include instructions to determine that a number of parties to the communications event has changed.

30. A system according to claim 29, wherein the instructions to determine that a number of parties to the communications event has changed, include instructions to determine that a new party is added to the communications event.

31. A system according to claim 27, wherein the instructions to update the rate schedule include instructions to determine a change in a communications event distance.

32. A method, comprising:
storing information representative of rate plans for at least two communications service providers, each of the rate plans having at least two predetermined connection rates, each of the at least two connection rates defining the respective relationship between services provided by a communications service provider and the fees retained by the communications service provider in exchange there for,
storing information associated with at least two user accounts including a respective account balance for each user account,
identifying a request to initiate a communications event,
determining the account balance associated with the request,
associating a rate plan with the request,
computing a rate schedule based on the at least two connection rates of the associated rate plan, and
determining a maximum allowable duration of the communications event for which an accrued cost of the communications event is approximately equal to the account balance based upon the computed rate schedule.

33. A method according to claim 32, wherein storing information representative of rate plans includes storing cost per second connection rates.

34. A method according to claim 32, further comprising
identifying a transfer of service from a first service provider to a second service provider, and
determining a duration of the communications event for which an accrued cost of the communications event is approximately equal to the account balance, based on the rate plan of second service provider handling the communications event.

35. A method according to claim 32, wherein computing a rate schedule includes determining a tax charge rate.

36. A method according to claim 32, wherein computing a rate schedule includes determining a factor based on at least one of: available free time, endpoints of the communications event, distance of the communications event, and time of day.

37. A method according to claim 32, further comprising terminating the communications event at the end of the determined duration.

38. A method according to claim 32, further comprising deducting the accrued cost of the communications event from the available balance upon termination of the communications event.

39. A method according to claim 32, wherein identifying a request to initiate a communications event includes identifying an initiation of a telephone call.

40. A method according to claim 32, wherein identifying a request to initiate a communications event includes identifying an initiation of a cellular telephone call.

41. A method according to claim 32, wherein determining the account balance includes at least one of:

receiving an account code from a user, and identifying a device initiating the request for the communications event.

42. A method according to claim 32, wherein determining the account balance includes at least one of:

receiving an account code from a recipient, and identifying a device receiving the communications event.

43. A system according to claim 32, wherein determining a duration includes determining a duration before authorizing the communications event.

44. A system according to claim 32, wherein determining a duration includes determining a duration based on the service provider handling the communications event.

45. A computer-readable medium having stored thereon a plurality of instructions, the plurality of instructions including instructions which, when executed by a processor, cause the processor to perform the steps of:

identifying a monetary account balance associated with a request for a communications event, associating a rate plan with the request, the rate plan being associated with at least two predetermined connection rates, each of the at least two connection rates defining the respective relationship between services provided by a communications service provider and the fees retained by the communications service provider in exchange therefor, computing a rate schedule based on the rate plan, and determining a maximum allowable duration of the communication event by comparing the rate schedule to the monetary account balance.

* * * * *

UNITED STATES PATENT AND TRADEMARK OFFICE
CERTIFICATE OF CORRECTION

PATENT NO. : 7,486,945 B2  Page 1 of 1
APPLICATION NO. : 10/795901
DATED : February 3, 2009
INVENTOR(S) : Paul Senn et al.

It is certified that error appears in the above-identified patent and that said Letters Patent is hereby corrected as shown below:

Title Page, Abstract, Item [57] line 1, "preparing" should read --prerating--;

Column 9, line 36, "10S" should read --105--;

Column 9, line 41, "110C" should read --100C--;

Column 9, line 49, "110C" should read --100C--;

Column 13, line 17, Claim 17, after "a", should read --a change in a communications event distance.--; and Column 14, line 37, Claim 32, "there for" should read --therefor--.

Signed and Sealed this

Twenty-fourth Day of November, 2009

David J. Kappos
*Director of the United States Patent and Trademark Office*